United States Patent [19]
Loomis

[11] 3,837,296
[45] Sept. 24, 1974

[54] SAFETY LATCH PIN FOR BULKHEADS
[75] Inventor: Russell M. Loomis, Palos Heights, Ill.
[73] Assignee: Unarco Industries, Inc., Chicago, Ill.
[22] Filed: Apr. 5, 1972
[21] Appl. No.: 241,311

[52] U.S. Cl............................ 105/376, 105/369 BA
[51] Int. Cl.............................................. B60p 7/14
[58] Field of Search ..................... 105/376, 369 BA; 280/179 R

[56] References Cited
UNITED STATES PATENTS
3,427,997   2/1969   Brown, Jr. et al............ 105/369 BA
3,478,700   11/1969  Lundvall et al.................... 105/376
3,625,544   12/1971  Goodwin et al. ................... 105/376

Primary Examiner—Drayton E. Hoffman
Attorney, Agent, or Firm—Norman Lettvin

[57] ABSTRACT

A safety latching and anti-ratcheting system for releasably securing lading cushioning systems which include a movable bulkhead, against lading stacked in a railway car or the like, where one side of said bulkhead normally receives the forces of the lading shifting within the car as said lading is being shipped. The latching system includes a plurality of retractable members mounted at the corners of said bulkhead, which members have integral latch pins at the ends thereof which engage latch strips mounted within said car. The latch pins are provided with a safety anti-ratcheting shape where the side of the pin toward the force-receiving side of the bulkhead is tapered and the side of the pin away from the force-receiving side is straight. Moreover, the terminal portions of said pins are shaped and adapted to readily extend into the latch pin receiving apertures or recesses in said latch strips.

4 Claims, 7 Drawing Figures

PATENTED SEP 24 1974 3,837,296

SAFETY LATCH PIN FOR BULKHEADS

BACKGROUND OF THE INVENTION

This invention relates to latching systems for use in lading cushioning systems; and more particularly to a safety anti-ratcheting configuration for the latch pins which extend into a latch strip for securing the bulkhead in position within a lading vehicle.

Lading cushioning systems for use in freight-carrying vehicles are well-known in the prior art and may include a single wall bulkhead which is adapted to be positioned against the lading or the newer pneumatic lading cushioning system in which pneumatic envelope means are disposed between a bulkhead and a lading-engaging panel attached thereto.

In either the single-wall bulkhead or the pneumatic system, retractable latch pins are provided at the corners of the bulkhead to latchably secure the bulkhead in a position within the vehicle, by engagement with apertured strips in the floor and the ceiling of the vehicle which are adapted to receive the latch pins.

The prior art latch pins have a generally cylindrical body section and a tapering frusto-conical terminal-end portion. The tapered portions are intended to assure easy entry of the pin into the aperture in the appropriate latch strip. However, if the latch pins are not properly extended into the aperture, a load or force applied to the bulkhead may cause it to "ratchet" and thus move substantial distances within the vehicle.

Generally, it is believed that ratcheting results when the pin has not properly extended into the aperture and is seated on the land or solid portion between the apertures. If the lading shifts, a force is applied to the bulkhead, causing the pin to move across the land and to begin to enter the adjacent aperture. However, if the force is sufficiently strong and the bulkhead is moving sufficiently fast, the pin will move across the aperture before the tapered portion extends into the aperture and thus the tapered portion of the pin will engage the far side of the aperture and act as a cam to urge the pin upwardly thereby permitting the pin to ride up onto the next adjacent land. This camming or ratcheting-type of action can continue until the bulkhead slows to a speed at which the pin can extend, beyond the taper, into the aperture or recess.

If the bulkhead moves away from the stacked lading before being securely latched, the lading will not be properly cushioned and may be damaged during shipment. Furthermore, if a person were in the car as it was being moved, for example during loading in a railroad yard, and the ratcheting occurred, he might be injured by the moving bulkhead.

It is therefore an object of this invention to provide a safety latching system for use with movable bulkheads which prevents or reduces the tendency for the bulkhead to ratchet or move substantial distances within the vehicle when the bulkhead has not been properly latched.

It is further an object of this invention to provide a latching system which is adapted for use with existing bulkheads and latch strips.

Another object of this invention is to provide a latching system which can be easily installed in existing bulkhead arrangements.

These and other objects will be appreciated from the following description and appended claims.

SUMMARY OF THE INVENTION

By virtue of this invention there is provided a safety latching system for use in lading cushioning systems, having movable bulkheads, to prevent or reduce the tendency of the bulkheads, if not properly latched, to ratchet within a lading-carrying vehicle. The improved system includes latch pin means which have a safety anti-ratcheting shape where the side portion of the pin away from the force-receiving side of the bulkhead is straight and the side portion toward the force-receiving side is tapered. This shape acts to reduce or prevent the "camming" type of action which permits "ratcheting" of the bulkhead. The improved latch pin arrangement may be readily installed on existing bulkheads in the same manner that replacements are installed, so that bulkheads having the frusto-conical tapered pins can be easily "field" serviced.

DESCRIPTION OF THE PREFERRED EMBODIMENT

Figures 1, 1A:
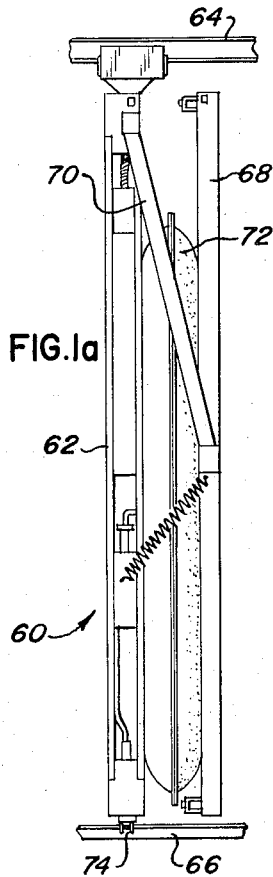
FIG. 1 is a side elevational view of a single-wall bulkhead which embodies the safety latching system of this invention.
FIG. 1a is a side elevational view of a pneumatic lading cushioning system with which said safety latching system may be employed.

Referring to FIG. 1, the lading cushioning system 10 generally includes a bulkhead 12 which is supported from and movable along a combination overhead track and latch strip 14 and a floor-mounted latch strip 16. The bulkhead 12 includes a face 18 which is to be positioned against the lading and receive the forces indicated by the arrow 20.

Figure 2:
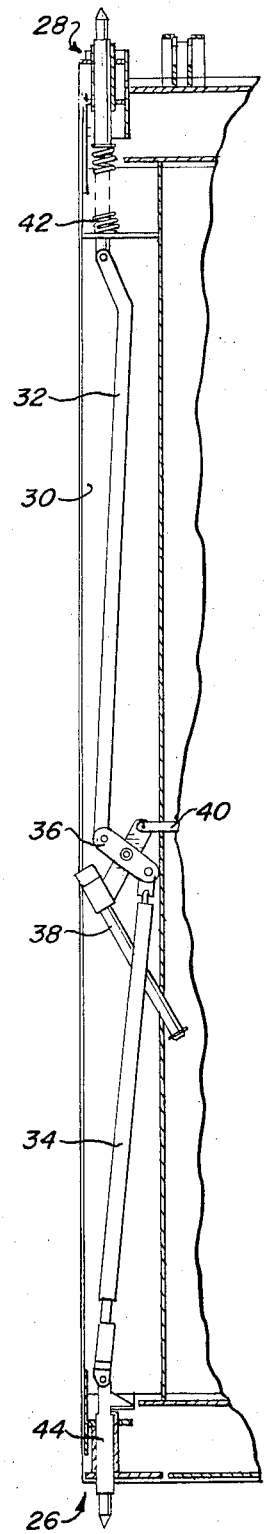
FIG. 2 is a fragmentary vertical-sectional view taken substantially along line 2—2 of FIG. 1 showing the latch pins and the latch pin operating mechanism.
Figure 5:
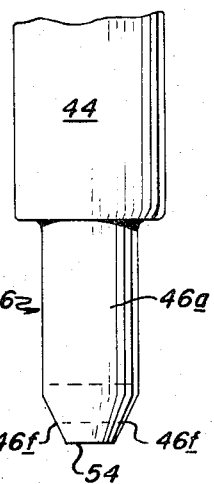
FIG. 5 is a fragmentary elevational view of the safety latch pin taken from the non-lading engaging side of the bulkhead and showing the straight side of the pin.

Latch pin means are provided at each corner of the bulkhead 12 and are spring-biased toward an extended position for engagement with the latch strip provided in association with the overhead track 14 and the floor-mounted latch strip 16. The lower latch pin means 26 is seen in FIG. 1, and both the upper and lower latch pin means 26 and 28 are seen in FIG. 2. Link means are provided for simultaneously retracting the latch pin means located at all four corners of the bulkhead. Such link means are disclosed in U.S. Pat. No. 3,168,055 and may be used to retract the pins made in accordance with this invention. The link means are located in a side post 30 provided at the upright side edge of the bulkhead. The link means include a pair of connecting arms 32 and 34, each of which connect at one end to the latch pin means 26 and 28 and at the other end to a linkage arrangement 36. A side operating handle 38 which is extendable outwardly of the side post 30 is connected to the linkage arrangement 36 which is also connected to the horizontal connecting rod 40. By extending the handle 38 outwardly of the side post structure and pulling it in the downward direction the latch pin means 26 and 28 as well as the counterpart latch pins on the other side of the bulkhead can be retracted into the unlatched position. A coiled compression spring 42 is provided which biases the upper latch pin means 28 toward the extended latching position and in so doing also urges the linkage mechanism and thus the lower latch pin means 26 toward the extended latched position.

The bottom latch pin means 26 includes a body portion 44 which connects to the arm 34 and to two tandem aligned latch pins 46 and 48. The pins, as in FIG. 3, have straight sides 46a and 48a and tapered side 46b and 48b. Each pin also has a cylindrical body section 46c or 48c which is of uniform cross section and a terminal portion 46d or 48d of reduced cross section. The body portion and terminal portion are merged by means of tapering section 46e or 48e so as to define the tapered side 46b or 48b, which is positioned toward the force-receiving side or lading-engaging face 18 of the bulkhead. The sides 46a and 48a are not tapered and are straight so that when the pins enter the apertures 50 and 52 in the latch strip there is no tapered or camming surface to urge the pin upwardly out of the aperture.

Figure 6:
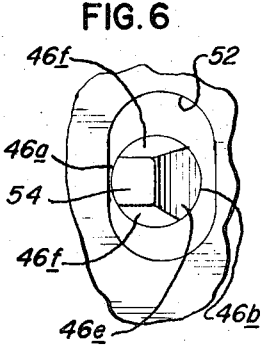
FIG. 6 is a bottom plan view taken substantially along line 6—6 of FIG. 3 showing a latch pin in an apertured latching strip.
Figure 4:
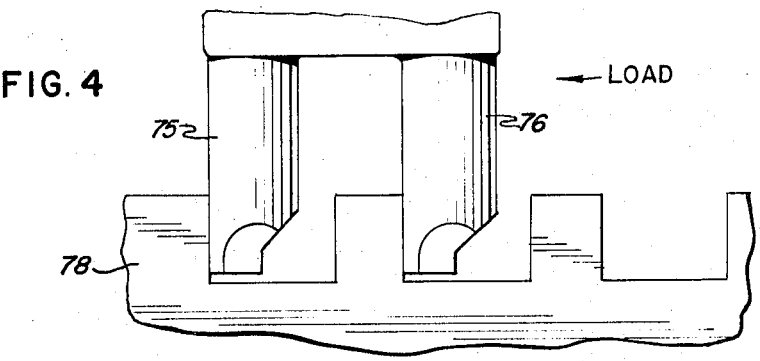
FIG. 4 is a fragmentary side sectional view similar to FIG. 3, showing another form of latch strip, with the latch pins extending into latching recesses.

The cross-sectional area of the terminal portions 46d and 48d are further reduced to enhance the ability of the pin to enter the apertures 50 and 52 by providing tapering cheek-like side sections 46f and 48f. These sections taper from the end of the terminal portion to a position adjacent the body section 46c or 48c. As seen in FIG. 6, the end 54 of the terminal portion 46d is of substantially reduced cross section as compared to the cross-sectional area of the aperture 52. This small cross-sectional area enhances the ability of the pin to enter the aperture 52. The side cheeks 46f and 48f also help guide the pin into the aperture in the event that the bulkhead is laterally misaligned with respect to the latch strip.

In the event that the latch pins are not properly extended into the latch strips, and during shipment the lading shifts which causes the bulkhead 12 to move along the overhead track 14, the chance of the bulkhead ratcheting or moving a substantial distance within the vehicle is considerably reduced since the terminal portions 46d and 48d enter the apertures 50 and 52 and the straight sides of the pins engage the aperture edge. Since the straight sides of the pins engage the aperture edge, there can be no upward camming action as would be the case with a frusto-conically tapered pin. Extension of the terminal portion of the pin into the respective apertures and prevention of the "camming" action causes the bulkhead to stop, thereby protecting the lading.

The latching arrangement described herein can be used in the pneumatic lading cushioning system 60 generally as shown in FIG. 1a. The system includes a bulkhead 62 which is supported and movable along the combination overhead track and latch strip 64. The bulkhead is latchable to the overhead strip 64 and the floor-mounted latch strip 66. A lading-engaging panel 68 is attached to the bulkhead 62 by arms such as 70 for movement toward and away therefrom. Pneumatic envelope means 72 are disposed between the bulkhead 62 and panel 68 for absorbing some of the forces applied to the panel 68 and transmitting the remaining forces to the bulkhead 62. In the cushioning system 60 the tapered sides of the pins 74 face toward the force-receiving side of the bulkhead 62 which is toward the envelope 72 and panel 68.

Figure 3:
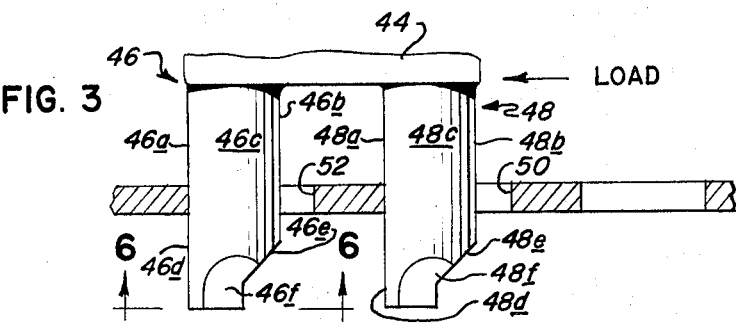
FIG. 3 is a fragmentary side sectional view, showing the latch pins of this invention extending into latching apertures in a latch strip.

Referring to FIG. 3, latch pins 75 and 76 are shown in their latching position in a cleanable floor latch strip 78. Cleanable-type floor latch strips are disclosed in U.S. Pat. No. 3,478,700 and generally include a continuous, open-top, longitudinal channel which defines a series of spaced, transversely oriented recesses that receive the latch pins.

It will be appreciated that numerous changes and modifications can be made to the embodiments disclosed herein without departing from the spirit and scope of this invention.

What is claimed and desired to be secured by Letters Patent of the United States is:

1. In a lading cushioning system, for use in a lading-carrying vehicle and which includes movable bulkhead means, latch-receiving means defining spaced apertures for receiving latches thereinto, a safety latching system, for releasably securing the bulkhead means in a lading-carrying vehicle such that one side of said bulkhead normally receives the forces caused by the lading shifting during transportation, said latching system including a plurality of retractable members each having at one end thereof integral latch pin means, said members being positioned at each of the upper and lower corners of the bulkhead means, and said pins being adapted to engage latch strips which are mounted in said vehicle at a position to receive said pins, the improvement in said system comprising at least said lower pins having a safety anti-ratcheting shape for assuring latchable securement of the bulkhead means and for preventing the bulkhead means from ratcheting or moving substantial distances within the vehicle in any direction when not properly latched, said anti-ratcheting pin shape comprising a main body portion of substantially uniform cross section and a terminal portion whose terminus provides a polygonal face, said terminal portion having one side that is an extension of the main body portion, other sides of the terminal portion being inclined from the periphery of the main body portion to the terminus to provide a generally frusto-conical cross-section for the terminal portion, and the side opposite said side extension of the main body being inclined more sharply than the other inclined sides so as to provide a more sharply tapered portion, that faces in the same direction as the force-receiving side of the bulkhead, and being located so that when said pin is fully extended the entire terminal portion extends completely through the latch receiving aperture in the associated latch strip and to locate the main body portion of the anti-ratcheting pin in the plane of the edges of the aperture.

2. A safety latching system as in claim 1 wherein said body portion is circular in cross section.

3. A safety latching system as in claim 1 wherein all the latch pins are provided with said safety configuration.

4. A safety latching system as in claim 1 wherein said lading cushioning system further includes lading-engaging panel means secured to said bulkhead means for movement toward and away therefrom and inflatable envelope means disposed between said bulkhead means and lading-engaging panel means for cushioning the forces applied to said lading-engaging panel.

* * * * *